United States Patent
Muenster et al.

(10) Patent No.: US 11,400,968 B2
(45) Date of Patent: Aug. 2, 2022

(54) METHOD FOR SETTING THE ACTIVATION FORCE FOR SECURING AN ADJUSTABLE STEERING COLUMN

(71) Applicants: thyssenkrupp Presta AG, Eschen (LI); thyssenkrupp AG, Essen (DE)

(72) Inventors: Andreas Muenster, Weissensberg (DE); Sebastian Schaedler, Triesenberg (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/254,917

(22) PCT Filed: Jul. 2, 2019

(86) PCT No.: PCT/EP2019/067649
§ 371 (c)(1),
(2) Date: Dec. 22, 2020

(87) PCT Pub. No.: WO2020/007814
PCT Pub. Date: Jan. 9, 2020

(65) Prior Publication Data
US 2021/0261185 A1    Aug. 26, 2021

(30) Foreign Application Priority Data
Jul. 4, 2018    (DE) ...................... 10 2018 211 046.8

(51) Int. Cl.
*B62D 1/181*    (2006.01)
*B62D 1/184*    (2006.01)

(52) U.S. Cl.
CPC ............. *B62D 1/181* (2013.01); *B62D 1/184* (2013.01)

(58) Field of Classification Search
CPC .................................. B62D 1/181; B62D 1/184
See application file for complete search history.

(56) References Cited

U.S. PATENT DOCUMENTS

| 6,073,965 A | 6/2000 | Kinoshita |
| 2005/0081674 A1 | 4/2005 | Nishioka |

(Continued)

FOREIGN PATENT DOCUMENTS

| CN | 2823991 Y | 10/2006 |
| CN | 101844581 A | 9/2010 |

(Continued)

OTHER PUBLICATIONS

English Translation of International Search Report issued in PCT/EP2019/067649, dated Oct. 23, 2019.

*Primary Examiner* — Drew J Brown
(74) *Attorney, Agent, or Firm* — thyssenkrupp North America, LLC (57) ABSTRACT

A method for setting an actuating force for securing a motor vehicle adjustable steering column. The actuating force is to be exerted on an actuating element for actuating a locking device of the steering column to switch the locking device between release and securing positions. The locking device has an adjustable adjustment element for setting the actuating force. The method includes: positioning the steering column within reach of a robot manipulator, controlled in an automated manner, in a pre-assembled state of the adjustment element, actuating the locking device by means of the robot manipulator, measuring the exerted actuating force, and comparing the measured actuating force to a specified reference value. If the measured actuating force corresponds to the reference value ending the method, and if the measured actuating force deviates from the reference value adjusting the adjustment element via the robot manipulator and returning to the actuating step.

20 Claims, 8 Drawing Sheets

(56) References Cited

U.S. PATENT DOCUMENTS

| | | | |
|---|---|---|---|
| 2005/0166700 A1* | 8/2005 | Ishida | B62D 1/184 |
| | | | 74/493 |
| 2005/0173914 A1* | 8/2005 | Sadakata | B62D 1/195 |
| | | | 280/777 |
| 2010/0242662 A1 | 9/2010 | Hirooka et al. | |
| 2011/0175335 A1 | 7/2011 | Takezawa et al. | |
| 2017/0247046 A1 | 8/2017 | Huber | |

FOREIGN PATENT DOCUMENTS

| | | |
|---|---|---|
| CN | 202593599 U | 12/2012 |
| CN | 103471863 A | 12/2013 |
| CN | 106627723 A | 5/2017 |
| DE | 10 2014 016 510 A | 2/2015 |
| EP | 2383165 A | 11/2011 |
| FR | 2583366 A | 12/1986 |
| GB | 2287773 A | 9/1995 |
| KR | 20140100061 A * | 8/2014 |
| WO | 03024734 A1 | 3/2003 |

\* cited by examiner

METHOD FOR SETTING THE ACTIVATION FORCE FOR SECURING AN ADJUSTABLE STEERING COLUMN

CROSS REFERENCE TO RELATED APPLICATIONS

This application is a U.S. National Stage Entry of International Patent Application Serial Number PCT/EP2019/067649, filed Jul. 2, 2019, which claims priority to German Patent Application No. DE 10 2018 211 046.8, filed Jul. 4, 2018, the entire contents of both of which are incorporated herein by reference.

FIELD

The present disclosure generally relates to a method for setting an actuating force for securing an adjustable steering column.

BACKGROUND

In a manually adjustable steering column, the adjusting unit in which the steering spindle is rotatably mounted can be adjusted to set the steering wheel position relative to the supporting unit attached in a fixed manner to the vehicle body, said steering wheel being attached to the rear, driver-side end of the steering spindle. For this purpose, a locking device is provided, which can be optionally brought into a release or securing position. In the release position, the adjusting unit, depending on the construction, can be displaced relative to the supporting unit in a vertical and/or longitudinal direction. The adjusting unit is secured on the supporting unit in the securing or locking position.

The switch between the release and securing position takes place via a manual actuation of an actuating element, for example by pivoting a tensioning lever, as described in the prior art, for example in DE 10 2014 016 510 A1. The tensioning lever is connected to a first end of a tensioning bolt of a locking device, which tensioning bolt can be rotated about its axis and passes through the supporting unit transversely to the steering spindle axis. For securing or release purposes, an actuating force is applied manually to a handle spaced from the axis, whereby the tensioning lever is pivoted and the tensioning bolt rotated. A tensioning gear, which is supported from the outside against the supporting unit, converts the rotational movement into a clamping travel of the tensioning bolt, which clamping travel is directed along the tensioning axis of the tensioning bolt. By means of its second end, remote from the tensioning lever, the tensioning bolt is supported from the outside against the opposite second side of the supporting unit or the adjusting unit via an adjustment element serving as an abutment, for example a nut screwed onto the tensioning bolt. By actuating the tensioning lever to close the locking device, a clamping force, with which the adjusting unit is braced and secured to the supporting unit, can be applied by the tensioning bolt. The release or opening of the locking device can take place by actuating the tensioning lever in the opposite direction, whereby the clamping force of the tensioning bolt is removed and an adjustment of the adjusting unit relative to the supporting unit is possible.

The actuating force on the actuating element for closing the locking device is referred to as a closing force; for release purposes, the so-called release force must be applied in the opposite direction.

The manual force which is required as an actuating force to switch the tensioning lever is dependent on the force transmission and the structural form of the tensioning gear, which can be designed, for example, as a wedge-plate, cam or tilt-pin mechanism, on the clamping force required and on the friction which occurs, and on the operative engagement of the clamping force. This operative engagement is determined by the effective introduction and exertion of the clamping force depending on the actuating position of the actuating element. The exertion can be specified by adjusting the adjustment element. For example, a nut serving as an adjustment element can be screwed onto the tensioning bolt to the extent that the clamping means is already slightly pretensioned in the release position and a high actuating force is required for the securing action. By releasing the adjustment element, the operative engagement is introduced later and the actuating force is reduced.

It is essential that the actuating force in the steering columns produced in series production is as uniform as possible, in particular the closing force. The actuating force can be adjusted via the setting of the adjustment element. In the prior art, the adjustment must, until now, be performed manually by experienced professionals in order to achieve the necessary consistency. This is disadvantageous in terms of the substantial effort, time and costs involved.

Thus, a need exists for a more efficient method for realizing a uniform actuating force.

This object is achieved according to the invention by a method having the features of claim 1. Advantageous developments are revealed in the subclaims.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method for setting an actuating force for securing an adjustable steering column and the actuating force is to be exerted on an actuating element for actuating a locking device of a steering column of a motor vehicle in order to switch the locking device between a release position and a securing position, and the locking device has an adjustable adjustment element which can be adjusted for setting the actuating force.

According to the invention, the implementation of the following steps is proposed:

A.) positioning the steering column within the movement area of a robot manipulator, controlled in an automated manner, in a pre-assembled state of the adjustment element, B.) actuating the locking device by means of the robot manipulator, C.) measuring the exerted actuating force, D.) comparing the measured actuating force to a specified reference value, E1.) if the measured actuating force corresponds to the reference value: ending the method.

E2.) if the measured actuating force deviates from the reference value:

G.) adjusting the adjustment element by means of a robot manipulator, controlled in an automated manner, and continuing the method with step B.).

According to the invention, in the case of a pre-adjusted steering column, in which the adjustment element is pre-secured with an assembly value generated from the previous production, for example an adjustment element designed as a nut is screwed on provisionally with a standard tightening torque, a defined specified actuating force for securing or releasing a manually adjustable steering column can be set in an automated manner by means of a robot manipulator. Complex manual adjustments until now required in the prior art can thus be omitted.

The inventive method starts with a starting state in which the steering column to be set is positioned within the working area of a robot manipulator. The robot manipulator can comprise a robot arm which is capable of multiaxial movement in a numerically controlled manner and via which an actuating force can be exerted on the actuating element, for example corresponding to the manual force on the handle of a tensioning lever, and by means of which the adjustment element can be set. As an alternative to one robot arm, two robot arms or differently designed robot adjusting devices, controllable in an automated manner, can be provided in order to move the actuating element and to adjust the adjustment element.

In the working area, the locking device can be actuated according to the invention by means of the robot manipulator. For example, the hand movement in the case of a manual actuation of the tensioning lever can be emulated by a multiaxial robot arm. To this end, the robot manipulator is controlled in an automated manner and moved towards the actuating element to simulate a manual actuation so that this actuating element actuates the locking device. The actuation can comprise closing, releasing or closing and releasing the locking device.

The actuating force exerted on the actuating element by the robot manipulator is measured during the actuation, for example the closing force required for closing purposes when switching the steering column from the release position to the securing position. A force sensor, for example, can be provided for the force measurement, which force sensor can be integrated in the robot manipulator and can record the force, and possibly also a force-displacement characteristic during the actuation of the actuating element, for example the pivoting of a tensioning lever. The measurement value(s) can be relayed electronically to a control device.

The measured actuating force is compared in an automated manner to a specified reference value in the control device or a data processing device connected thereto. If this comparison reveals that the measured actuating force—within a specified permissible tolerance range—corresponds to the reference value, the steering column is already fully adjusted and can be provided for assembly in a motor vehicle. In the other case, in which there is a deviation outside the tolerance range, i.e. the measured actuating force is impermissibly high or low, a re-adjustment is required.

To this end, the adjustment device is adjusted in the next step. This can take place by means of the robot manipulator by means of which the actuation of the actuating element also takes place, for example a multiaxial robot arm, or by means of a further robot manipulator.

The adjustment of the adjustment element preferably takes place depending on the measured actuating force. The deviation of the measured actuating force from the reference value determines the amount of the adjustment of the adjustment element by which the adjustment element must be adjusted to compensate the deviation according to a previously known function. For example, an adjustment element which is formed by a nut screwed onto a tensioning bolt can be implemented to adjust a defined tightening torque depending on the measured deviation, or a tightening angle determined on the basis of the deviation can be set.

The locking device is adjusted after the adjustment of the adjustment element. To ensure that the actuating force has been brought within the range of the stipulated reference value as a result of the adjustment procedure, a repetition of the method steps take place, beginning with the inventive actuation of the locking device by means of the robot manipulator. This jump to method step B.) and the subsequent execution of the steps C.) and D.) is repeated until, in E1.), the measured actuating force corresponds to the reference value, i.e. it is within a specified permissible tolerance range.

The adjustment as a result of setting the adjustment element can take place in the securing position which is realized after the closure of the locking device. It is alternatively possible to firstly release the locking device by means of the robot manipulator via an actuation in the opposite direction and to perform the adjustment in a release position.

The actuating force is preferably measured as a closing force when closing (securing) the locking device and/or a release force when releasing the locking device. The clamping force must be generated via the closing force, which is to be applied manually to secure the steering column, and is higher than the release force. Therefore, an adjustment of the closing force which is as uniform as possible is essential for optimum functioning and a high-quality impression of the steering column. However, in the case of the inventive adjustment, it is likewise possible to take into account the release force whereby, for example, impermissibly high friction in the locking device can be determined for the purpose of quality assessment.

The inventive method enables deviations from the reference value to be evaluated in an automated manner and to be converted into an adjustment of the adjustment element according to a known functional relationship, for example a tightening angle, through which a nut serving as an adjustment element is adjusted, to be calculated from a measured deviation. Therefore, only one adjustment procedure will generally be required in order to set the locking device in an optimum manner. In contrast to the prior art, in which re-adjustment is conventionally performed multiple times, this means a significant reduction in the time and effort involved.

It can be provided that the adjustment of the adjustment element takes place by means of the robot manipulator used to move the actuating element, or the movement of the actuating element takes place by means of a first robot manipulator and the adjustment of the adjustment element takes place by means of a second robot manipulator. The robot manipulator can have at least one multiaxial robot arm. As a result of the varied and flexible movement options, the actuation of the actuating element, for example the pivoting of a tensioning lever, and the setting of the adjustment element, for example the tightening of a nut, can take place by means of a single robot arm which can be equipped with corresponding actuating means, tool attachments and sensors and which is moved between the actuating and adjustment position in the sequence of the inventive method steps. Alternatively, it is also conceivable and possible to provide two or more robot manipulators, for example a robot arm for actuating the actuating element and a further robot adjusting device for setting the adjustment element.

To carry out the method, it can be advantageous that the robot manipulator executes an automated search movement for generating an actuating engagement with the actuating element and/or the adjustment element. Although the steering column is positioned in the working area of the robot manipulator, slight positional and/or orientation deviations, for example of the tensioning lever, or a nut of the adjustment element, can occur in practice. Instead of approaching fixedly specified positions in a purely mechanical manner, a robot arm can, for example, execute oscillating or rotary movements in space in an automated manner, advantageously along movement paths in the form of Lissajous figures, and determine the actual position of actuating and adjustment elements by means of suitable sensor technology, for example optical or acoustic distance sensors or touch-sensitive tactile sensors. As soon as a suitable relative positioning is determined whilst passing through the search position, for example the robot arm comes into contact with a tensioning lever during the actuating engagement, the inventive method steps can be started in an automated manner. Manual control of the method is therefore superfluous, thereby in turn reducing the effort involved.

The inventive method can be advantageously used to set a steering column, wherein the actuating element is a tensioning lever which is fastened to a tensioning bolt, which can be rotated about its axis, and on which the handle is arranged at a radial spacing from the axis, the actuating force being applied to the handle. For closing or release purposes, a closing or release force can be applied by the robot manipulator, preferably in an arcuate movement about the axis, to adjust the steering column, similarly to a manual actuation.

By means of the invention method, a steering column can preferably be adjusted, wherein it is provided that the tensioning bolt passes through a supporting unit, connectable to the body of a motor vehicle, of the steering column, in which an adjusting unit, which comprises a rotatably mounted steering spindle, is adjustably received, wherein the tensioning bolt cooperates with a tensioning gear, which converts the actuating force into a clamping force acting in the direction of the axis to clamp the adjusting unit on the supporting unit. The tensioning bolt can be guided transversely through two side cheeks of the supporting unit, between which the adjusting unit can be braced for securing purposes. Alternatively, only one side cheek can be provided, against which the adjusting unit is braced as a result of the clamping force.

The adjustment element can comprise a nut screwed onto the tensioning bolt, which nut is tightened with a tightening torque by the robot manipulator to set the actuating force. A higher tightening torque results in a stronger bracing of the adjusting unit in the supporting unit with a higher clamping force, which causes an increase in the actuating force, and vice versa.

An advantageous development of the method comprises the following steps:

a1.) if the locking device is in the release position: continue with step b2.), a2.) if the locking device is in the securing position: continue with step b1.)

b1.) moving the robot manipulator towards the actuating element in a release direction to apply a release force for releasing the locking device up to the release position, b2.) moving the robot manipulator towards the actuating element in a closing direction to apply an actuating force as a closing force for closing the locking device, c1.) measuring the exerted closing force, d1.) comparing the measured closing force to a specified reference value, e1.) if the measured closing force corresponds to the reference value: ending the method, e2.) if the measured closing force deviates from the reference value:

g1.) adjusting the adjustment element by means of a robot manipulator, controlled in an automated manner, and continuing the method with step b1.).

The decision steps a1.) and a2.) follow the positioning of the steering column within the movement area of a robot manipulator, controlled in an automated manner, in a pre-assembled state of the adjustment element according to the above-mentioned step A.). In the state a1.), the steering column is in the release position. During production, the pre-assembled steering column is preferably transported in the secured state according to a2.), whereby uncontrolled relative movements of the supporting and adjusting unit are avoided.

The first actuation of the locking device by means of the robot manipulator according to step B.) then takes place depending on whether the steering column is in the secured or released position. If, according to a2.), it is in the secured position, the locking device is firstly released according to b1.) before it is closed according to b2.), i.e. switched back into the securing position. If, according to a1.), it is already in the released position, the securing procedure according to b2.) can take place directly.

According to c1.), the measurement of the exerted actuating force relates to the measurement of the exerted closing force.

The comparison of the measured actuating force and a specified reference value takes place accordingly according to d1.) by comparing the measured closing force with a specified reference value.

If the actuating force measured according to e1.) as a closing force corresponds to the reference value—within a specified tolerance range—the method is ended.

If, according to e2.) the measured closing force deviates from the reference value, according to g1.)—analogously to step G.)—an adjustment of the adjustment element follows by means of a robot manipulator controlled in an automated manner, and the continuation of the method takes place with step b1.), namely the movement of the robot manipulator in the release direction up to the release position.

Alternatively, prior to G.) or g1.), in an additional step F.) or f1.), an actuation of the locking device in the opposite direction can take place by means of the robot manipulator by moving the robot manipulator towards the actuating element in the release direction to release the locking device. The adjustment of the adjustment element can then take place in the release position.

Figure 1:
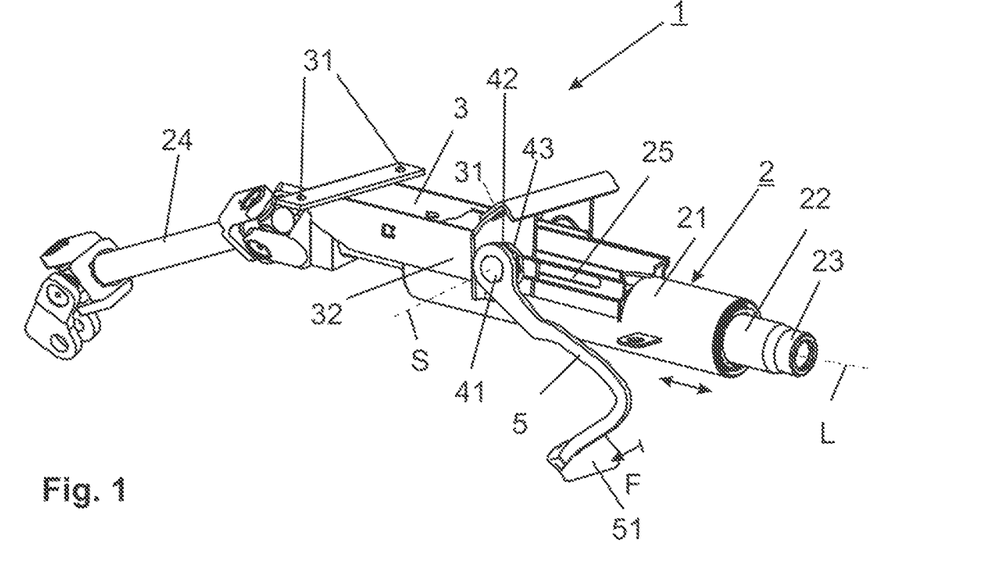
FIG. 1 is a schematic perspective view of a steering column.

FIG. 1 shows, in a schematic perspective view, a steering column 1, which has an adjusting unit 2 in which a steering spindle 22 is mounted in a casing tube 21 such that it is rotatable about its longitudinal axis L. At its rear end with respect to the direction of travel, which faces the driver, the steering spindle 22 has a fastening portion 23 for attaching a steering wheel (not illustrated). At the front end, an intermediate shaft 24 is coupled in an articulated manner for connection to a steering gear (not illustrated).

A supporting unit 3 has fastening means 31 for fastening to a body (not illustrated here) of a motor vehicle. As is clearly revealed in the cross-section shown in FIG. 2, the adjusting unit 2 is received between two side cheeks 32, which are transversely opposite one another relative to the longitudinal axis L.

Figure 2:
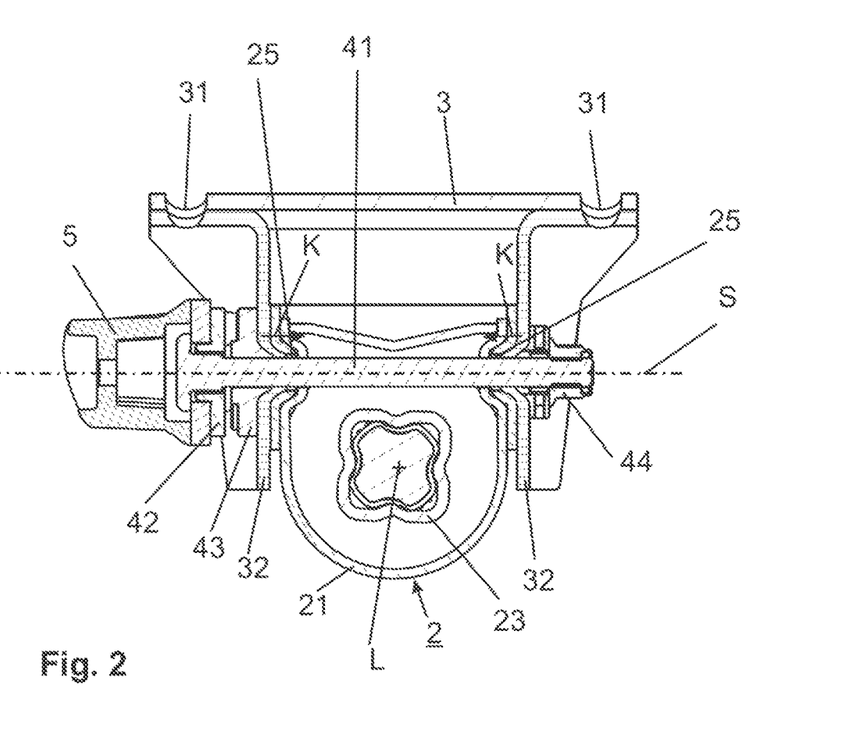
FIG. 2 is a cross-section through the steering column according to FIG. 1.

A locking device 4 comprises a tensioning bolt 41, which extends through the side cheeks 32 and an elongated hole 25 in the adjusting unit 2 such that it can be rotated about a tensioning axis S transversely to the longitudinal axis L. The elongated hole 25 is elongate parallel to the longitudinal axis L.

A tensioning lever 5 is fastened in a torsion-resistant manner at one end of the tensioning bolt 41 as an actuating element, which tensioning lever has a handle 51 spaced from the tensioning axis S.

A tensioning gear has a first cam disk 42, connected in a torsion-resistant manner to the tensioning bolt 41, and a second cam disk 43 supported from the outside on the side cheek 32 such that it is stationary relative to the first cam disk. A nut 44 screwed onto the tensioning bolt 41 is supported on the opposite side cheek 32.

If the tensioning axis S is rotated into the securing position by exerting an actuating force F, namely the closing force, on the handle 51 in the closing direction, the cam disk 42 is lifted off the cam disk 43 in the axial direction S of the tensioning bolt 41. A clamping force K, with which the adjusting unit 2 is braced between the side cheeks 32, is thus introduced via the tensioning bolt 41 into the side cheeks 32 from the outside, in the direction of the tensioning axis S, as indicated by the arrows directed towards one another.

In the case of an actuation in the opposite direction via a release force directed contrary to the closing force, the spacing between the cam disks 42, 43 becomes smaller and the clamping force K exerted via the tensioning bolt 41 is removed. In this release position, the adjusting unit 2 can be longitudinally displaced and set relative to the supporting unit 3 for the purpose of a longitudinal adjustment, as indicated by the double-headed arrow in FIG. 1. The desired longitudinal position is secured by actuating the tensioning lever 5 for switching to the securing position.

The setting of the actuating force F according to the inventive method can take place as schematically illustrated in various phases in FIGS. 3 to 16.

In an x-y-z Cartesian coordinate system, a steering column 2 is positioned in the working area of a robot manipulator 6, 7 with the longitudinal axis L parallel to the y axis. This corresponds to step A.) of the inventive method. The robot manipulator 6 is designed as a robot arm 6 which is multiaxially controllable in an automated manner and is movable along pre-programed movement paths. The tensioning axis S extends parallel to the x direction. In each case, the illustration on the left in the figures shows a view in the z direction, the illustration adjacent to it on the right shows a view in the x direction.

Figure 3:
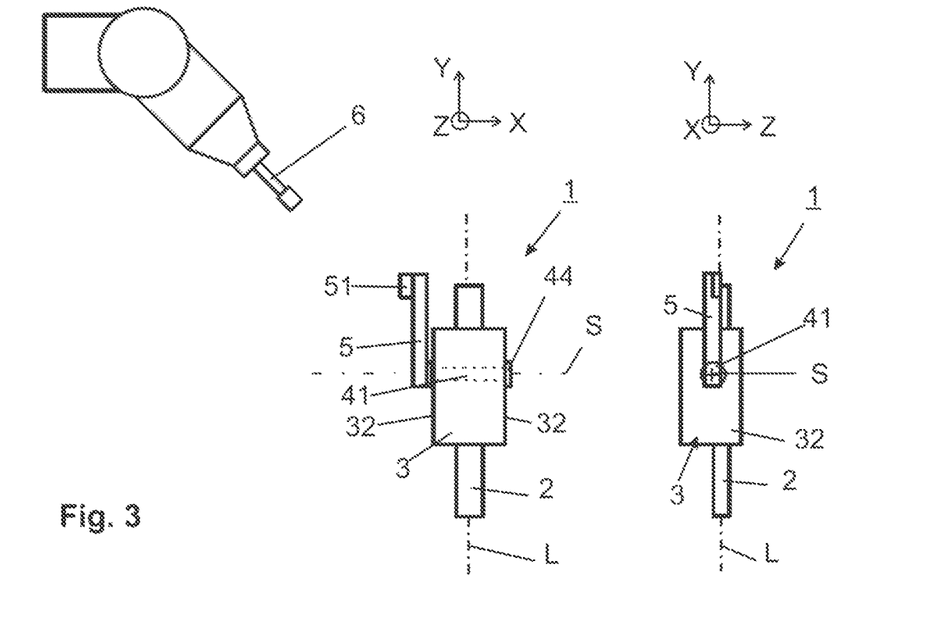
FIG. 3 is a schematic view of a first phase of the inventive method.
Figure 4:
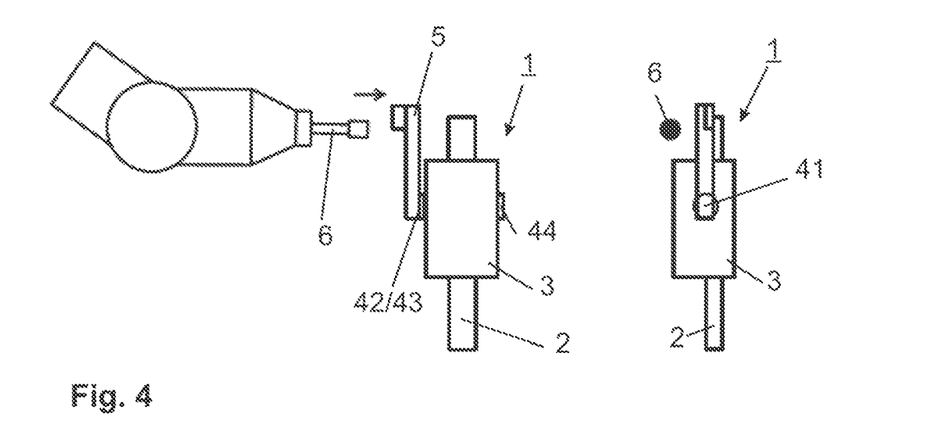
FIG. 4 is a schematic view as in FIG. 3 of a subsequent phase.

In FIGS. 3 and 4, the steering column 1 is in the securing position, according to step a2.). The robot arm 6 is now moved in the x direction until, as shown in FIGS. 4 and 5, it is located behind the handle 51 of the tensioning lever 5, as seen in the z direction with respect to the release direction.

Figure 5:
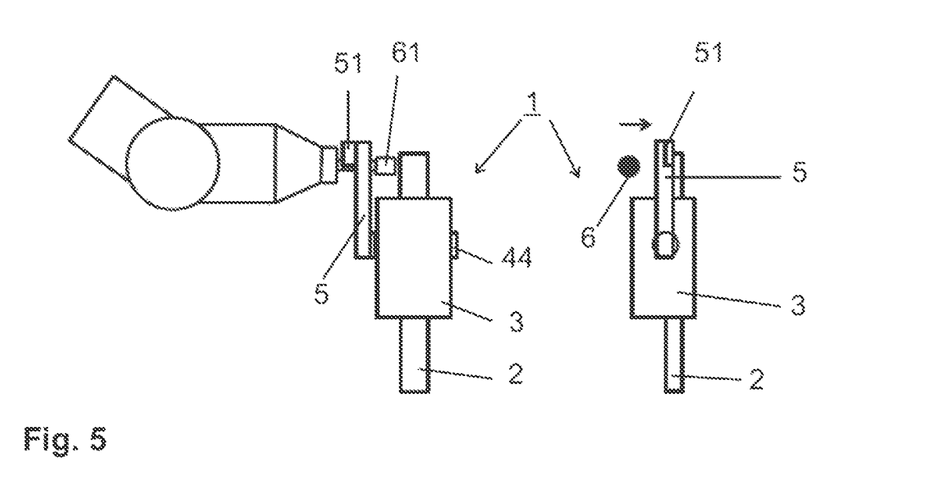
FIG. 5 is a schematic view as in FIG. 4 of a subsequent phase.
Figure 6:
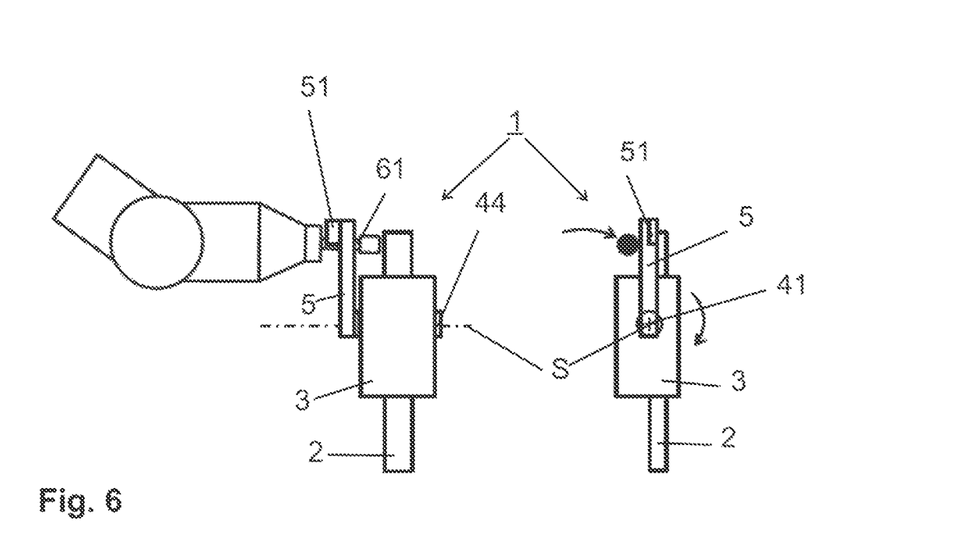
FIG. 6 is a schematic view as in FIG. 5 of a subsequent phase.

The robot arm 6 is then moved in the release direction, firstly towards the handle 51 in the z direction, as indicated by the arrow in FIG. 5, until it is in contact with the handle 51, as shown in FIG. 6.

Starting from the position illustrated in FIG. 6, the robot arm 6 executes an arcuate movement about the tensioning axis S, whereof the radius corresponds to the spacing of the handle 51 from the said tensioning axis S.

Figure 7:
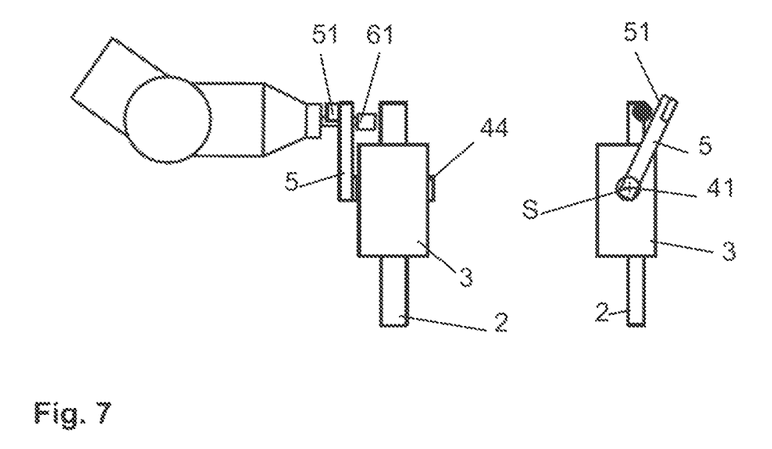
FIG. 7 is a schematic view as in FIG. 6 of a subsequent phase.
Figure 8:
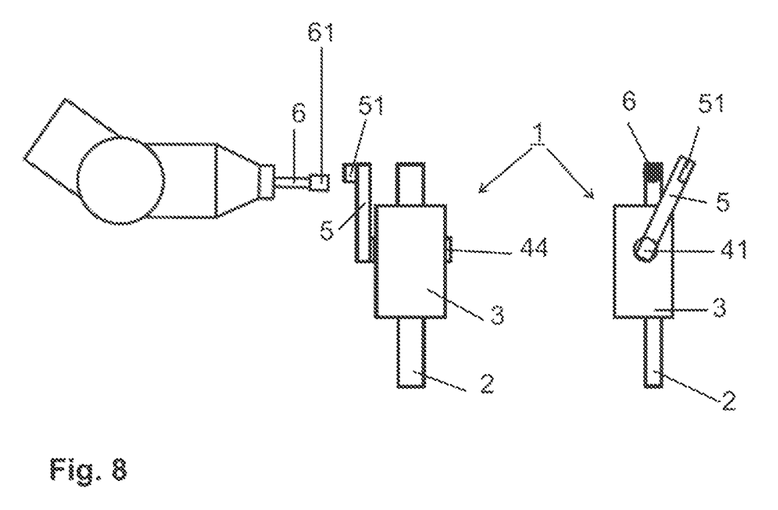
FIG. 8 is a schematic view as in FIG. 7 of a subsequent phase.
Figure 9:
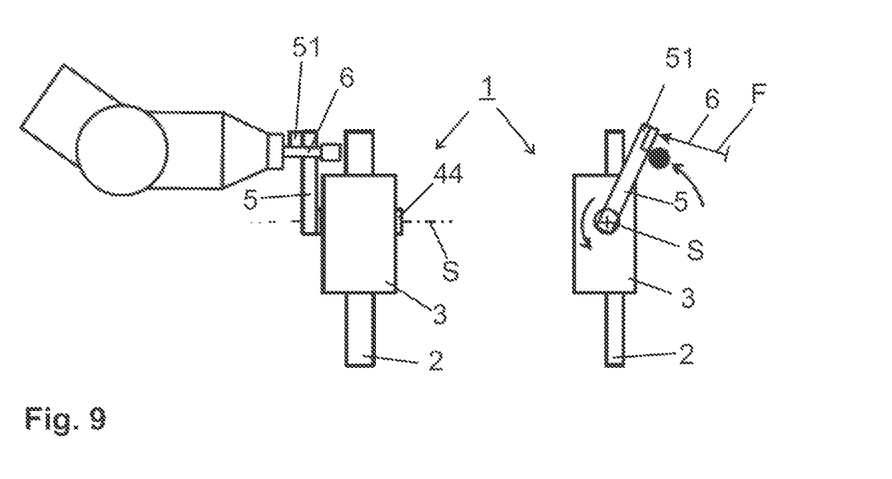
FIG. 9 is a schematic view as in FIG. 8 of a subsequent phase.
Figure 10:
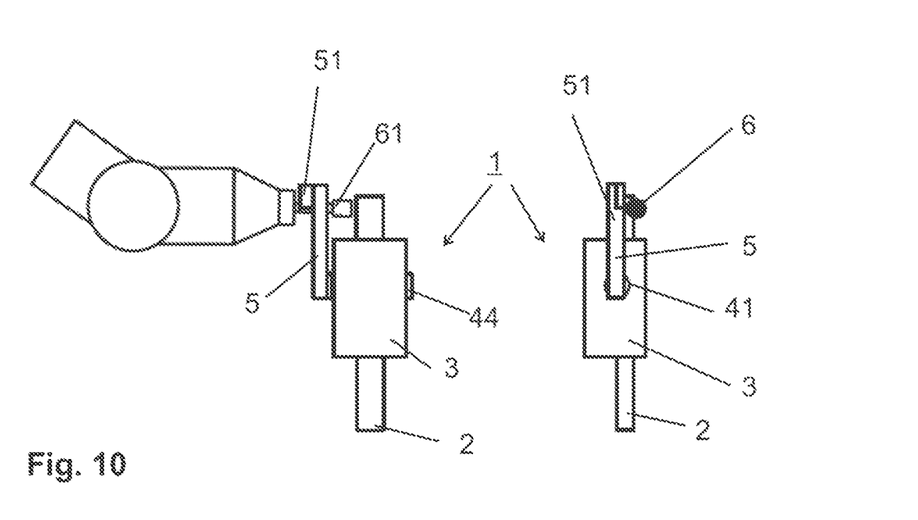
FIG. 10 is a schematic view as in FIG. 9 of a subsequent phase.

The arcuate movement results in a movement of the tensioning lever 5 and, accordingly, a rotation of the tensioning bolt 41 in the release direction, according to step b1.), until the release position shown in FIG. 7 is reached, in which an adjustment of the steering column 1 would be possible, as indicated by the double-headed arrow in FIG. 1. When the release position is reached, the robot arm 6 is moved back as shown in FIG. 8 and moved to the other side of the handle lever 5, i.e. in the closing direction—contrary to the release direction—and towards the lever until contact is made, as illustrated in FIG. 9.

Starting from the position illustrated in FIG. 9, the robot arm 6 is again moved in an arcuate movement—in the opposite direction to the release movement—this time in the closing direction towards the handle 51 of the tensioning lever 5, corresponding to step b2.). In this case, a closing force F is exerted on the tensioning lever 5 as an actuating force and transmitted to the side cheeks 32 as a clamping force K via the cam disk 43, the tensioning bolt 41 and the nut 44.

According to step C.) or c1.) of the method, until the securing position (illustrated in FIG. 10) is reached, the closing force exerted for closing the locking device 4 is recorded during the execution of the arcuate movement by means of a force sensor (not illustrated in detail) in the robot arm 6.

The measured closing force is now compared in a control device to a reference value specified therein, according to step d1.) or D.).

Figure 11:
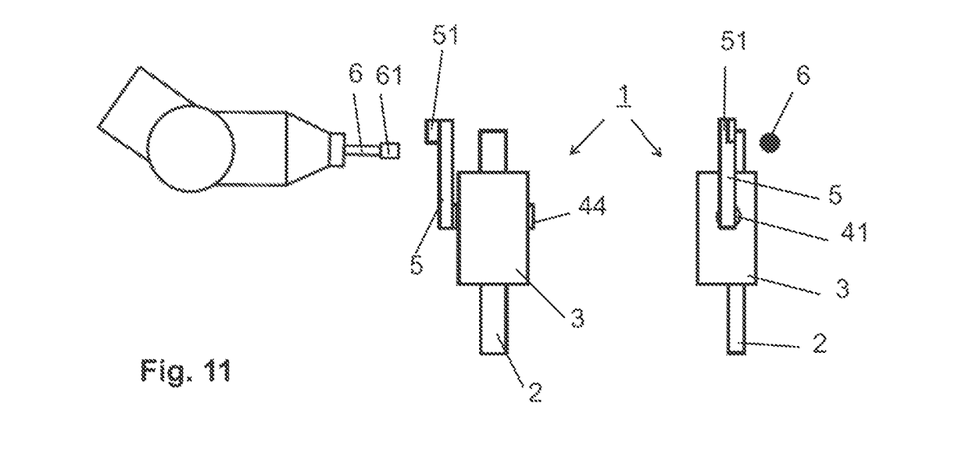
FIG. 11 is a schematic view as in FIG. 10 of a subsequent phase.

If the measured closing force corresponds to the reference value within a specified tolerance range, the locking device is already fully adjusted and the final assembly state is achieved. The method is ended according to step E1.) or e1.) and the robot manipulator 6 is moved back as shown in FIG. 11.

Figure 12:
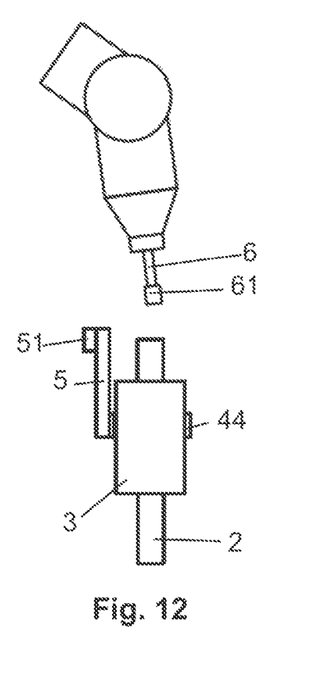
FIG. 12 is a schematic view as in FIG. 11 of a subsequent phase.

If the measured actuating force deviates from the reference value beyond a specified tolerance, according to step E2.) or e2.), an adjustment of the nut 44 serving as an adjustment element takes place by means of the robot arm 6 according to G.) or g1.). To this end, this robot arm can be moved as indicated in FIG. 12 and brought into the position shown in FIG. 13, in front of the nut 44.

Figure 13:
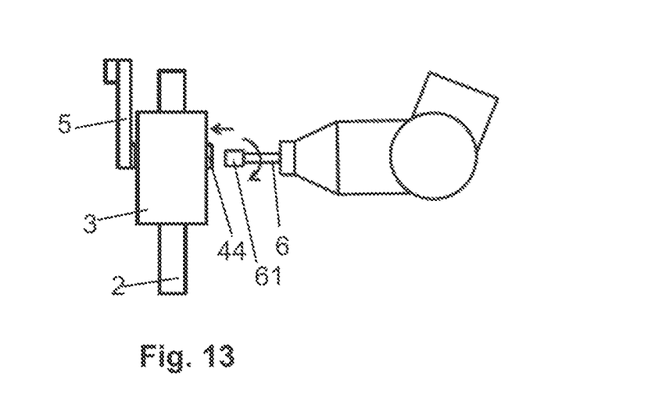
FIG. 13 is a schematic view as in FIG. 12 of a subsequent phase.
Figure 17:
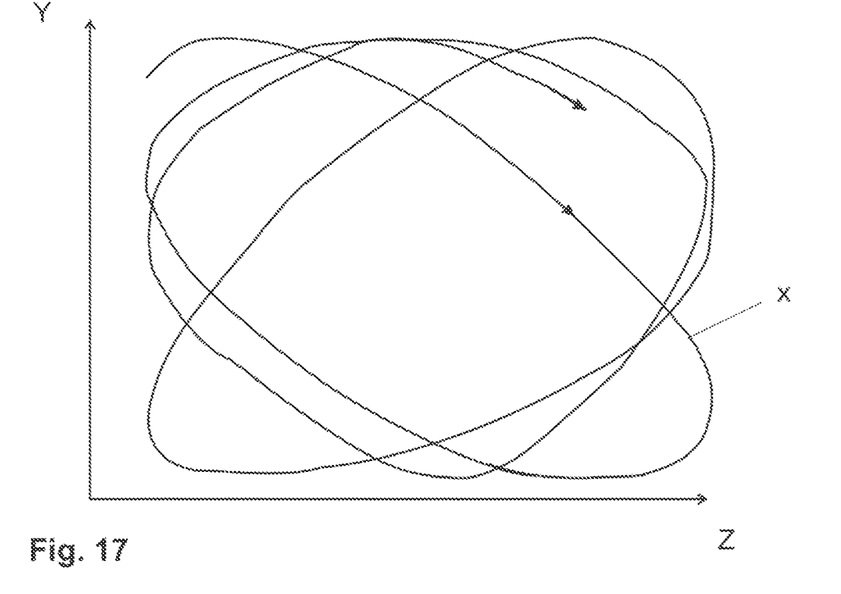
FIG. 17 is a schematic view of a movement path of a search movement.

In FIG. 13, as seen in the x direction, the robot arm 6, with a tool 61 attached thereto, is located in front of the nut 44 on which the tool 61 can be placed to generate a form-fitting tool engagement. To place the tool 61 on the nut 44, the robot arm 6 executes a search movement of the tool 61, for example in the y-z plane with a movement path in the form of a Lissajous figure, as illustrated in FIG. 17. In the process, the tool 61 is moved closer in the x direction until it is pushed onto the nut 44, as illustrated in FIG. 14.

Figure 14:
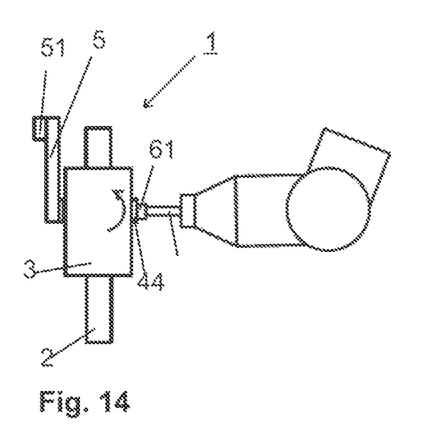
FIG. 14 is a schematic view as in FIG. 13 of a subsequent phase.

In FIG. 14, the nut 44 is tightened by a rotation of the tool 61 and an adjustment is thus realized. For example, a tightening angle through which the nut 44 is tightened or released can be determined from the measured deviation of the closing force from the reference value. Once this adjustment has taken place, the tool 61 is pulled away, as shown in FIG. 15.

To check the adjustment, the robot arm is now moved back into the position shown in FIG. 4 and the steps shown in FIG. 4 up to and including FIG. 11 are performed again. If, as expected, the measured closing force now corresponds to the reference value within a specified tolerance range, the locking device is already successfully adjusted. The method is ended according to step E1.) or e1.) and the robot manipulator 6 is moved back, as shown in FIG. 11.

Figure 15:
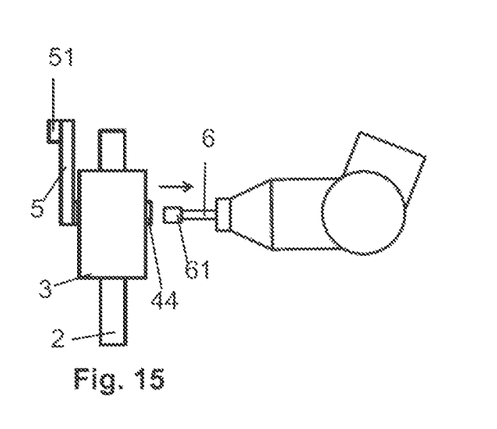
FIG. 15 is a schematic view as in FIG. 14 of a subsequent phase.
Figure 16:
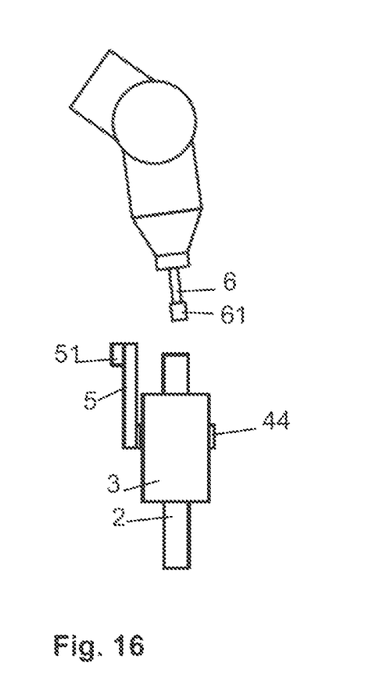
FIG. 16 is a schematic view as in FIG. 15 of a subsequent phase.
Figure 18:
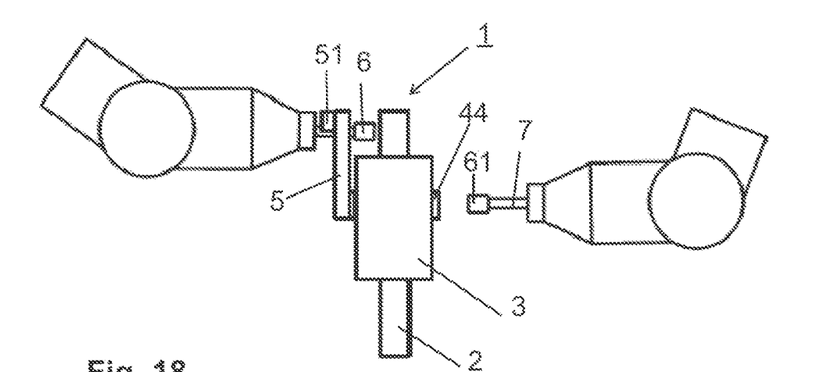
FIG. 18 is a schematic view of a second variant of the inventive method.
Figure 19:
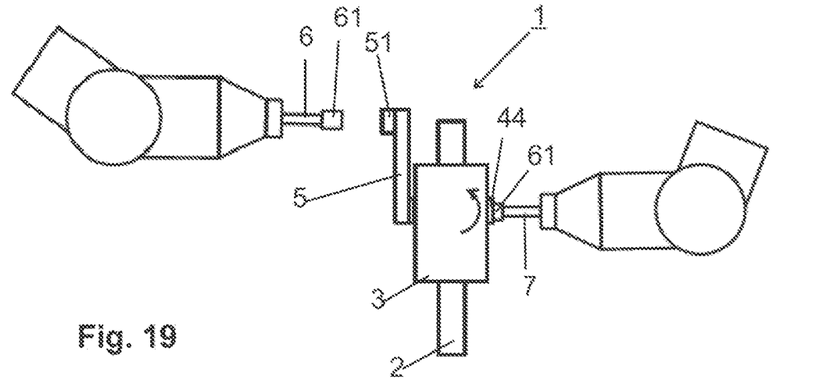
FIG. 19 is a schematic view as in FIG. 18 of a subsequent phase.

In FIGS. 18 and 19, the method steps shown in FIGS. 13 to 15 are shown by means of a robot manipulator which has two robot arms 6 and 7. The robot arm 6 serves solely for actuating the tensioning lever 5, analogously to the steps shown in FIGS. 6 and 11, and the robot arm 7, which can be constructed similarly or more simply in terms of its movement options and which has the tool 61, serves solely for adjusting the nut 44 for adjustment purposes.

LIST OF REFERENCE SIGNS

1 Steering column
2 Adjusting unit
21 Casing tube
22 Steering spindle
23 Fastening portion
24 Intermediate shaft
25 Elongated hole
3 Supporting unit
31 Fastening means
32 Side cheek
4 Locking device
41 Tensioning bolt
42, 43 Cam disk
44 Nut
5 Tensioning lever
51 Handle
6, 7 Robot arm, robot manipulator
61 Tool
L Longitudinal axis
S Tensioning axis

What is claimed is:

1. A method for setting an actuating force to secure an adjustable steering column, the actuating force exerted on an actuating element to actuate a locking device of a steering column for a motor vehicle to switch the locking device between a release position and a securing position, the locking device including an adjustable adjustment element which is configured to adjustably set the actuating force, the method comprising:
   A) positioning the steering column within reach of a robot manipulator, controlled in an automated manner, in a pre-assembled state of the adjustment element,
   B) actuating, via the robot manipulator, the locking device,
   C) measuring the exerted actuating force,
   D) comparing the measured actuating force to a specified reference value,
   E1) when the measured actuating force corresponds to the reference value: ending the method, and
   E2) when the measured actuating force deviates from the reference value:
   G) adjusting, via the robot manipulator, the adjustment element, controlled in an automated manner, and continuing the method with said actuating step, wherein said adjusting of the adjustment element takes place by means of the robot manipulator used to move the actuating element, or the movement of the actuating element takes place by means of a first robot manipulator and the adjustment of the adjustment element takes place by means of a second robot manipulator.

2. The method claim 1 wherein the actuating force is measured as a closing force when closing the locking device and/or a release force when releasing the locking device.

3. The method of claim 1 wherein said adjusting step takes place depending on the measured actuating force.

4. The method of claim 1 wherein the robot manipulator has at least one multiaxial robot arm.

5. The method of claim 1 wherein the robot manipulator is configured to execute an automated search movement for generating an actuating engagement with the actuating element and/or the adjustment element.

6. The method of claim 1 wherein the actuating element is a tensioning lever which is fastened to a tensioning bolt, which is configured to rotate about an axis, and on which a handle is arranged at a radial spacing from the axis, the actuating force being applied to the handle in an arcuate movement about the axis by the robot manipulator.

7. The method of claim 6 wherein the tensioning bolt passes through a supporting unit, connectable to the body of a motor vehicle, of the steering column, in which an adjusting unit, which comprises a rotatably mounted steering spindle, is adjustably received, wherein the tensioning bolt cooperates with a tensioning gear, which is configured to convert the actuating force into a clamping force acting in the direction of the axis to clamp the adjusting unit on the supporting unit.

8. The method of claim 6 wherein the adjustment element comprises a nut screwed onto the tensioning bolt, said nut tightened with a tightening torque, or is adjusted through a tightening angle, by the robot manipulator to set the actuating force.

9. The method as claimed of claim 1, further comprising:
   a1) when the locking device is in the release position: continue with step b2)
   a2) when the locking device is in the securing position: continue with step b1)
   b1) moving the robot manipulator towards the actuating element in a release direction to apply a release force for releasing the locking device up to the release position,
   b2) moving the robot manipulator towards the actuating element in a closing direction to apply an actuating force as a closing force for closing the locking device,
   c1) measuring the exerted closing force,
   d1) comparing the measured closing force to a specified reference value,
   e1) when the measured closing force corresponds to the reference value: ending the method, and
   e2) when the measured closing force deviates from the reference value:
   g1) adjusting, via the robot manipulator, the adjustment element, controlled in an automated manner, and continuing the method with step b1).

10. A method for setting an actuating force to secure an adjustable steering column, the actuating force exerted on an actuating element to actuate a locking device of a steering column for a motor vehicle to switch the locking device between a release position and a securing position, the locking device including an adjustable adjustment element which is configured to adjustably set the actuating force, the method comprising:
    A) positioning the steering column within reach of a robot manipulator, controlled in an automated manner, in a pre-assembled state of the adjustment element,
    B) actuating, via the robot manipulator, the locking device,
    C) measuring the exerted actuating force,
    D) comparing the measured actuating force to a specified reference value,
    E1) when the measured actuating force corresponds to the reference value: ending the method, and
    E2) when the measured actuating force deviates from the reference value:
    G) adjusting, via the robot manipulator, the adjustment element, controlled in an automated manner, and continuing the method with said actuating step,
    wherein the robot manipulator executes an automated search movement for generating an actuating engagement with the actuating element and/or the adjustment element.

11. The method claim 10 wherein the actuating force is measured as a closing force when closing the locking device and/or a release force when releasing the locking device.

12. The method claim 10 wherein said adjusting step takes place depending on the measured actuating force.

13. The method claim 10 wherein the robot manipulator has at least one multiaxial robot arm.

14. The method claim 10 wherein the actuating element is a tensioning lever which is fastened to a tensioning bolt, which is configured to rotate about an axis, and on which a handle is arranged at a radial spacing from the axis, the actuating force being applied to the handle in an arcuate movement about the axis by the robot manipulator.

15. The method claim 14 wherein the tensioning bolt passes through a supporting unit, connectable to the body of a motor vehicle, of the steering column, in which an adjusting unit, which comprises a rotatably mounted steering spindle, is adjustably received, wherein the tensioning bolt cooperates with a tensioning gear, which is configured to convert the actuating force into a clamping force acting in the direction of the axis to clamp the adjusting unit on the supporting unit.

16. The method claim 14 wherein the adjustment element comprises a nut screwed onto the tensioning bolt, said nut tightened with a tightening torque, or is adjusted through a tightening angle, by the robot manipulator to set the actuating force.

17. The method as claimed of claim 10, further comprising:
    a1) when the locking device is in the release position: continue with step b2)
    a2) when the locking device is in the securing position: continue with step b1)
    b1) moving the robot manipulator towards the actuating element in a release direction to apply a release force for releasing the locking device up to the release position,
    b2) moving the robot manipulator towards the actuating element in a closing direction to apply an actuating force as a closing force for closing the locking device,
    c1) measuring the exerted closing force,
    d1) comparing the measured closing force to a specified reference value,
    e1) when the measured closing force corresponds to the reference value: ending the method, and
    e2) when the measured closing force deviates from the reference value:
    g1) adjusting, via the robot manipulator, the adjustment element, controlled in an automated manner, and continuing the method with step b1).

18. The method of claim 10 comprising adjusting the adjustment element according to a known functional relationship involving the adjustment element.

19. The method of claim 10 comprising adjusting the adjustment element, which is configured as a nut, according to a known functional relationship involving a tightening angle of nut.

20. The method of claim 10 wherein execution of the automated search movement comprises moving a robot arm in an oscillatory movement or a rotary movement to locate the actuating element and/or the adjustment element, wherein execution of the automated search movement utilizes at least one of an optical sensor, an acoustic distance sensor, or a touch-sensitive tactile sensor.

* * * * *